United States Patent [19]

Nakahara et al.

[11] Patent Number: 5,363,373
[45] Date of Patent: Nov. 8, 1994

[54] DIGITAL MOBILE STATION USING PRESETTABLE TIMESLOT COUNTER FOR COMPENSATING FOR PROPAGATION DELAY TIME

[75] Inventors: Kenji Nakahara; Jiro Tsundoda, both of Tokyo, Japan

[73] Assignee: NEC Corporation, Tokyo, Japan

[21] Appl. No.: 876,173

[22] Filed: Apr. 30, 1992

[30] Foreign Application Priority Data

Apr. 30, 1991 [JP] Japan .................. 3-128566

[51] Int. Cl.$^5$ .......................... H04J 3/06; H04L 7/00
[52] U.S. Cl. ...................... 370/95.1; 370/95.3; 370/104.1; 370/108; 375/109; 455/13.2; 455/67.6; 455/69
[58] Field of Search ............... 370/29, 103, 104.1, 370/24, 95.1, 95.3, 108; 375/109; 455/12.1, 13.1, 13.2, 24, 53.1, 54.1, 67.1, 67.6, 69, 33.1, 34.1, 34.2, 51.1; 379/58, 59, 63

[56] References Cited

U.S. PATENT DOCUMENTS

| | | | |
|---|---|---|---|
| 3,922,496 | 11/1975 | Gabbard et al. | 370/95.3 |
| 4,513,416 | 4/1985 | Fujiwara | 370/104.1 |
| 4,577,316 | 3/1986 | Schiff | 370/104.1 |
| 4,607,257 | 8/1986 | Noguchi | 370/104.1 |
| 4,689,787 | 8/1987 | Hotta | 370/104.1 |
| 4,800,560 | 1/1989 | Aoki et al. | 370/104.1 |
| 5,072,445 | 12/1991 | Nawata | 370/104.1 |

*Primary Examiner*—Alpus H. Hsu
*Attorney, Agent, or Firm*—Sughrue, Mion, Zinn, Macpeak & Seas

[57] ABSTRACT

In a TDMA cellular mobile communications system, a mobile station receives a TDM signal from a cell site and detects a sync, a timeslot assignment signal and a signal indicating the propagation delay time of signals between the cell site and the mobile station. From an assigned timeslot, a time interval from a detected frame sync to the time of transmission of a burst signal from the mobile station is determined. The propagation delay time indicated by the detected signal is subtracted from the determined time interval. When a frame sync is detected from the received TDM signal, clock pulses are counted until it corresponds to the subtracted time interval, whereupon a timing pulse is generated to cause a burst signal to be transmitted from the mobile station to the cell site.

2 Claims, 2 Drawing Sheets

DIGITAL MOBILE STATION USING PRESETTABLE TIMESLOT COUNTER FOR COMPENSATING FOR PROPAGATION DELAY TIME

BACKGROUND OF THE INVENTION

The present invention relates generally to mobile communications systems, and more specifically to a mobile station which transmits burst signals at such times that the round-trip propagation delay time of signals between each cell site and the mobile station is compensated.

In time division multiple access digital communications systems, the propagation delay time of a signal sent from a cell site and the same amount of delay time involved with a signal sent in response to it from a mobile station are the factor that must be taken into account to allow the cell site to precisely detect signals from preassigned timeslots. Conventional mobile stations are provided with a plurality of delay elements which are controlled by a detected propagation delay time in such a manner that the round-trip propagation delay time is compensated. However, the operating performance of such delay elements are sensitive to ambient temperatures and variabilities exist among the delay times of different mobile stations. Difficulty thus arises to precisely control and maintain the propagation delay time factor for each mobile station.

SUMMARY OF THE INVENTION

It is therefore an object of the present invention to provide a mobile station having propagation delay time compensation circuitry that is free from the effects of ambient temperature and variability problems.

A digital mobile station receives a time-division multiplex (TDM) signal from a cell site of a cellular mobile communications system. The TDM signal contains a sequence of frames each having a frame sync signal and a signal indicating a propagation delay time from the cell site to the mobile station. According to the present invention, the delay time indicating signal and the timeslot assignment signal are detected by the mobile station from the received TDM signal. The detected propagation delay time signal is subtracted from the timeslot assignment signal to produce a difference time signal. When the frame sync is detected from the received TDM signal, clock pulses are counted to produce a clock count value. A timing pulse is generated when the clock count corresponds to the difference time signal. A burst signal is transmitted from the mobile station to the cell site in response to the timing pulse.

BRIEF DESCRIPTION OF THE DRAWINGS

The present invention will be described in further detail with reference to the accompanying drawings, in which.

DETAILED DESCRIPTION

Figure 1:
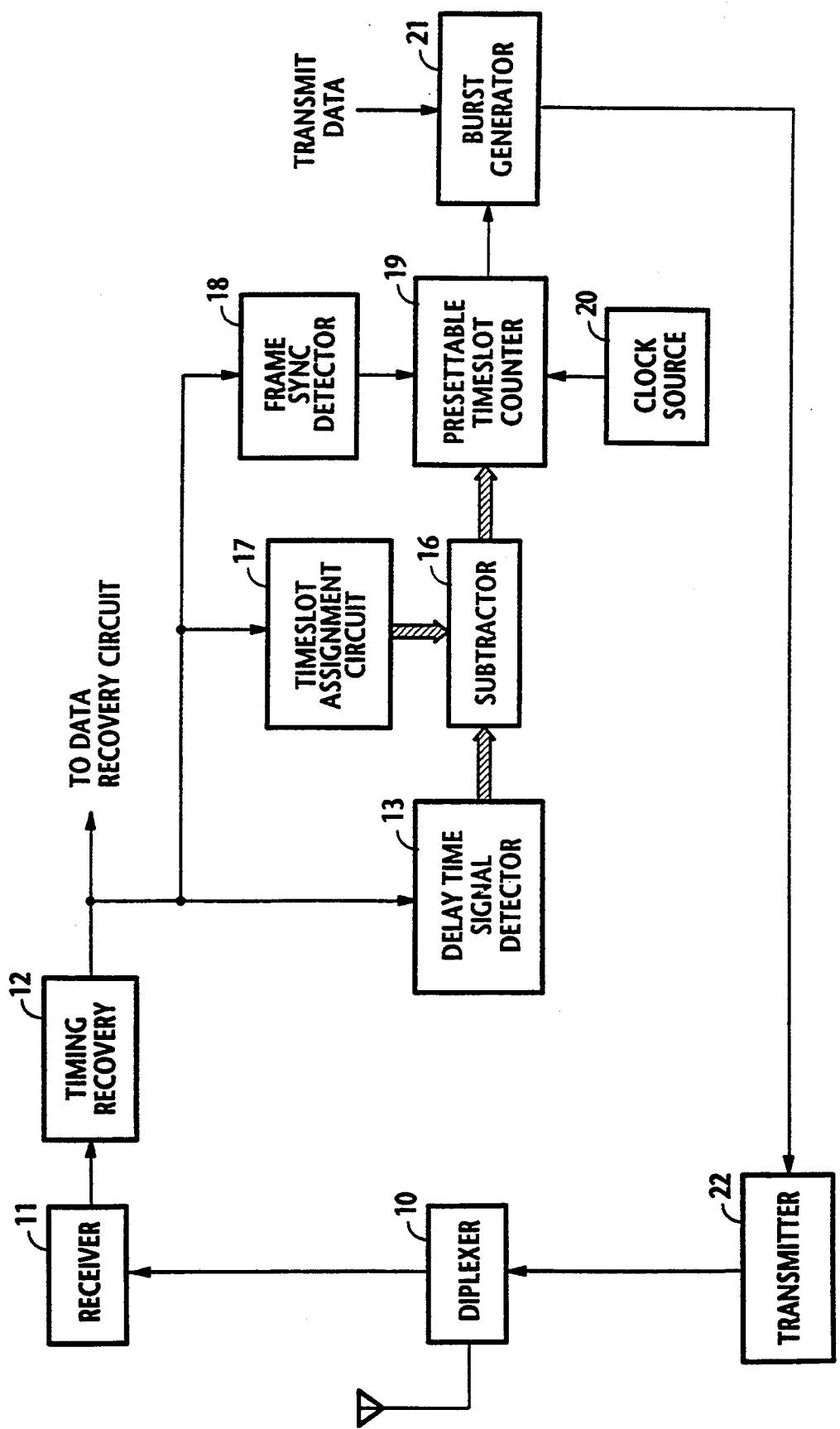
FIG. 1 is a block diagram of a mobile telephone according to the present invention.

Referring now to FIG. 1, there is shown a digital mobile station according to an embodiment of the present invention for use in a cellular mobile communications system. The system includes a plurality of base stations located at cell sites. Each base station is capable of calculating the amount of propagation delay time between the cell site and each mobile station using signals received from mobile stations in a known manner. A signal indicating the propagation delay time is transmitted together with a destination identifier, a timeslot assignment signal indicative of the position of an assigned timeslot and an information-bearing signal in a TDM (time-division multiplex) frame format.

The mobile station shown in FIG. 1 is receiving such a TDM signal from a nearby cell site through diplexer 10 and receiver 11 in which it is converted to an intermediate frequency signal and applied to a timing recovery circuit 12. Following carrier and clock recovery procedures performed in a manner well known in the art, timing recovery circuit 12 supplies its output to a data recovery circuit, not shown, and to a delay time signal detector 13 for detecting the delay time indicating signal contained in a timeslot destined to the mobile station. The output of detector 13, which is indicative of the propagation delay time from the cell site to the mobile station, is fed into a subtractor 16 in which it is subtracted from a timeslot count value representing the amount of time from the reception of a frame sync to the time of transmission of a burst signal on an assigned timeslot in which the mobile station is allowed to transmit. This timeslot count value is derived from a known timeslot assignment circuit 17 by decoding a timeslot assignment signal contained in the transmitted signal. The subtracted timeslot count is of a propagation delay-time compensated value and is used to preset the full count value of a presettable timeslot counter 19.

A frame sync detector 18 is connected to the output of timing recovery circuit 12 for detecting a frame sync code from the beginning of each frame and enabling the counter 19 to start counting clock pulses from a clock source 20. When the clock count reaches the preset values, timeslot counter 19 supplies a timing signal to a burst generator 21 to allow it to generate a burst signal containing transmit information-bearing and feeds it to a transmitter 22 in which the burst signal is converted in frequency and amplified for transmission through diplexer 10 to the cell site.

Figure 2:
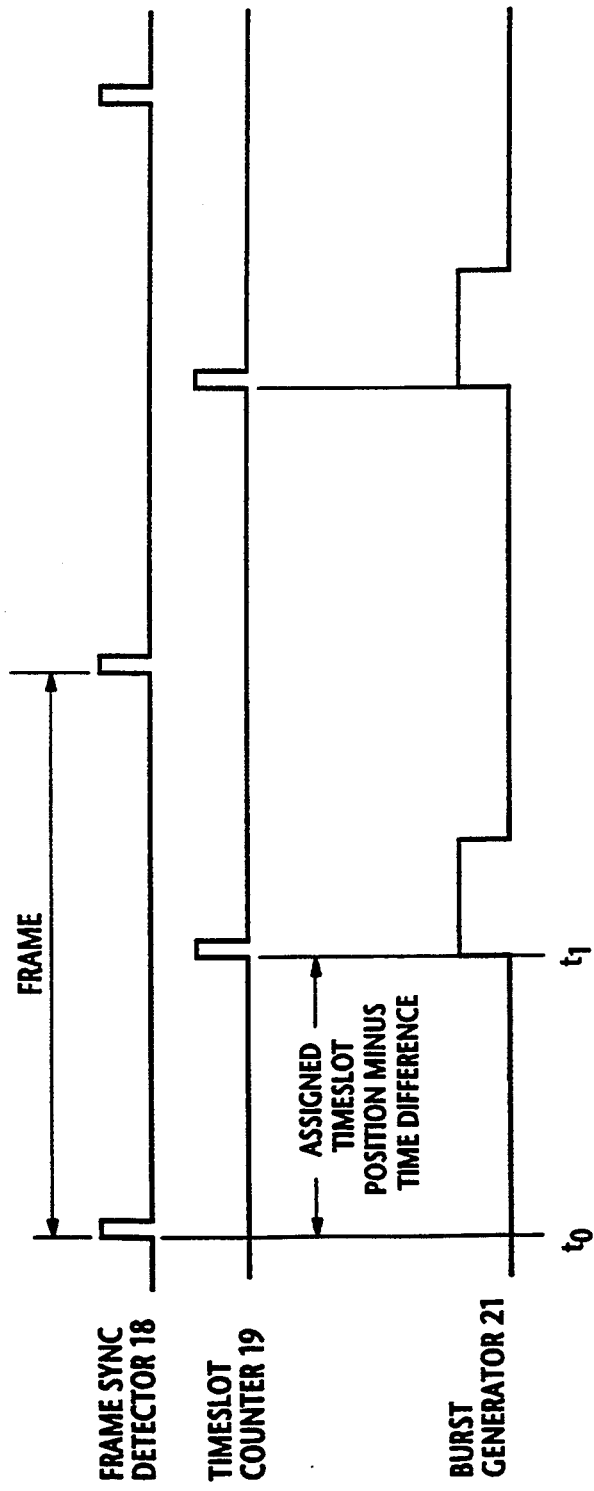
FIGS. 2 and 3 are timing diagrams useful for describing the operation of the present invention.

In operation, assume that a propagation delay time T exists between a cell site and the mobile station, and that the latter is assigned a k-th timeslot by the timeslot assignment circuit 17. A propagation delay time signal is extracted by the detector 13 to detect the delay time T, which is subtracted by subtractor 16 from the count value given by assignment circuit 17 representing the interval between a detected frame sync pulse and the start timing of the assigned k-th timeslot. Timeslot counter 19 is preset by the output of subtractor 16. Frame sync detector 18 extracts a frame sync pulse from the received TDM signal at time $t_0$ (see FIG. 2) and, in response, timeslot counter 19 is enabled to start counting clock pulses from clock source 20. Timeslot counter 19 thus produces a timing pulse at time $t_1$ when the count value preset by the subtractor 16 is reached.

Figure 3:
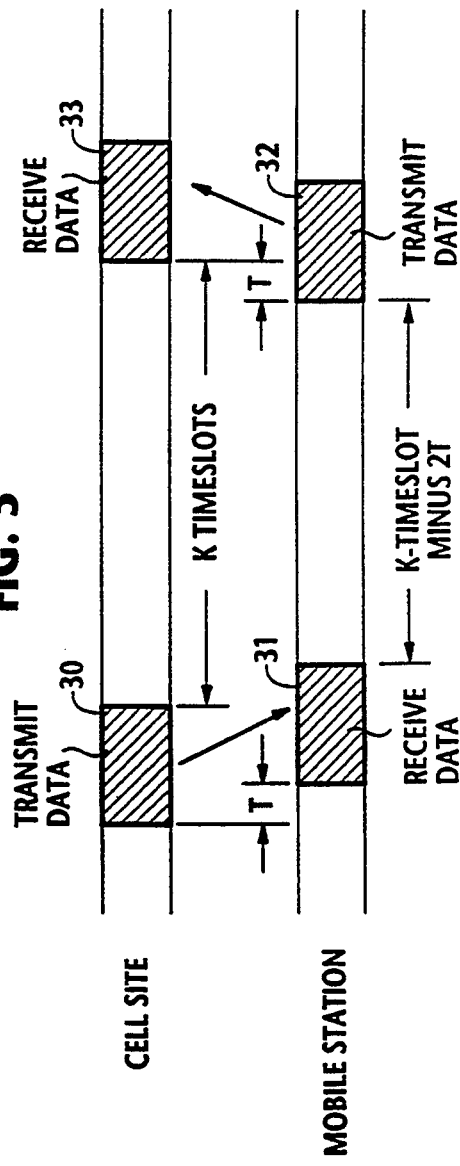

It is seen in FIG. 3 that transmit information-bearing signal or data 30 from the cell site is received as shown at 31 after the elapse of delay time T and, at the end of k-timeslot interval minus 2T from the end of receive data 31, transmit data 32 is sent from the mobile station and received by the cell site as shown at 33 at time which is k timeslots spaced from the transmit data 30.

In this way, the round-trip propagation delay time 2T is automatically compensated for by the present invention.

What is claimed is:

1. A digital mobile station for receiving a time-division multiplex (TDM) signal from a cell site of a cellular mobile communications system, the TDM signal containing a sequence of frames each containing a frame sync signal, a timeslot assignment signal indicative of the position of an assigned timeslot in said frame and a signal indicating a propagation delay time from the cell site and said mobile station, comprising:

detector means for detecting said delay time indicating signal from the received TDM signal;

timeslot assignment means for detecting said timeslot assignment signal and producing a timeslot count value representing the amount of time from the reception of a frame sync signal to the time of transmission of a burst signal from the mobile station;

subtractor means for subtracting the delay time indicating signal detected by said detector means from said timeslot count value detected by said timeslot assignment means and producing a subtracted timeslot count value;

frame sync detector means for detecting said frame sync signal from each frame of the received TDM signal;

a clock pulse source for generating clock pulses;

a presettable timeslot counter arranged to be set by said subtracted timeslot count value from said subtractor means and counting said clock pulses in response to said frame sync signal detected by said frame sync detector means and producing a timing pulse when the count of the clock pulses is equal to said preset count value; and means for transmitting said burst signal to said cell site in response to said timing pulse.

2. In a digital mobile station for receiving a time-division multiplex (TDM) signal from a cell site of a cellular mobile communications system, said TDM signal containing a sequence of frames each containing a frame sync signal, a timeslot assignment signal indicative of the position of an assigned timeslot in a frame and a signal indicating a propagation delay time from the cell site to a mobile station, a method comprising the steps of:

a) detecting said delay time indicating signal from the received TDM signal;

b) detecting said timeslot assignment signal and producing a timeslot value representing the amount of time from the reception of said frame sync signal to the time of transmission of a burst signal from the mobile station;

c) subtracting the delay time indicating signal detected by the step (a) from the timeslot count value detected by the step (b) to produce a subtracted timeslot count value;

d) detecting said frame sync signal from the received TDM signal;

e) counting clock pulses to produce a clock count value in response to the frame sync signal detected by the step (d) and producing a timing pulse when the clock count is equal to said subtracted timeslot count value; and f) transmitting said burst signal to said cell site in response to said timing pulse.

* * * * *

UNITED STATES PATENT AND TRADEMARK OFFICE
CERTIFICATE OF CORRECTION

PATENT NO. : 5,363,373
DATED : November 8, 1994
INVENTOR(S) : Kenji NAKAHARA et al.

It is certified that error appears in the above-indentified patent and that said Letters Patent is hereby corrected as shown below:

On the title page, item [75], please change the Inventor form "Tsundoda" and insert --Tsunoda--

ABSTRACT, line 3, before "syne" and insert --frame--.

Col. 1, line 39, after "signal" insert --, a timeslot assignment signal indicative of the position of a timeslot assigned in a frame,--.

Signed and Sealed this

Second Day of May, 1995

Attest:

BRUCE LEHMAN

*Attesting Officer*        *Commissioner of Patents and Trademarks*